United States Patent [19]

Miyano

[11] Patent Number: 5,748,385
[45] Date of Patent: May 5, 1998

[54] OBJECTIVE LENS FOR VARIABLE FIELD ANGLE ENDOSCOPE

[75] Inventor: Hitoshi Miyano, Saitama-ken, Japan

[73] Assignee: Fuji Photo Optical Co., Ltd., Saitama-ken, Japan

[21] Appl. No.: 505,961

[22] Filed: Jul. 24, 1995

[30] Foreign Application Priority Data

Aug. 9, 1994 [JP] Japan ................ 7-187332

[51] Int. Cl.$^6$ .................. G02B 15/14; G02B 21/02
[52] U.S. Cl. ...................... 359/691; 359/656
[58] Field of Search .................. 359/656, 657, 359/658, 659, 660, 661, 690

[56] References Cited

U.S. PATENT DOCUMENTS

| | | | |
|---|---|---|---|
| 2,050,024 | 7/1936 | Sonnefeld | 359/657 |
| 3,481,665 | 12/1969 | Rosenberger | 359/657 |
| 3,609,005 | 9/1971 | Nakamura | 359/690 |
| 4,149,774 | 4/1979 | Hirano et al. | 359/679 |
| 4,729,643 | 3/1988 | Kawaguchi et al. | 359/690 |
| 5,061,053 | 10/1991 | Hirakawa | 359/690 |
| 5,103,341 | 4/1992 | Ulrich et al. | 359/657 |
| 5,191,473 | 3/1993 | Kashima et al. | 359/658 |
| 5,257,134 | 10/1993 | Sugawara | 359/690 |
| 5,274,503 | 12/1993 | DeJager | 359/657 |
| 5,481,405 | 1/1996 | Simbal | 359/690 |

FOREIGN PATENT DOCUMENTS

| 2188709 | 7/1990 | Japan . |
|---|---|---|
| 405142477 | 6/1993 | Japan . |

*Primary Examiner*—Scott J. Sugarman
*Attorney, Agent, or Firm*—Sixbey Friedman Leedom & Ferguson; Gerald J. Ferguson, Jr.; Evan R. Smith

[57] ABSTRACT

An objective lens for use in a variable field angle endoscope which enables its field angle without increasing the diameter of the front end of the endoscope or complicating the shape of the same by moving a rear set of lenses between two positions where a conjugate distance of the rear set of lenses for image formation becomes substantially the same. Release lenses of a third group lens group are movable between two positions in the direction of the optical axis. When the relay lenses are situated at a first position, i.e., a wide angle position, the field angle of the objective lens becomes large. However, when the relay lenses are situated at a second position, i.e., a telephoto position, the field angle of the same becomes small. When the relay lenses are switched from one position to the other position, a focused image of a subject is formed at a second image formation position without changing a distance between first and second image formation positions, i.e., without changing a conjugate distance or the positions of other lenses.

17 Claims, 3 Drawing Sheets

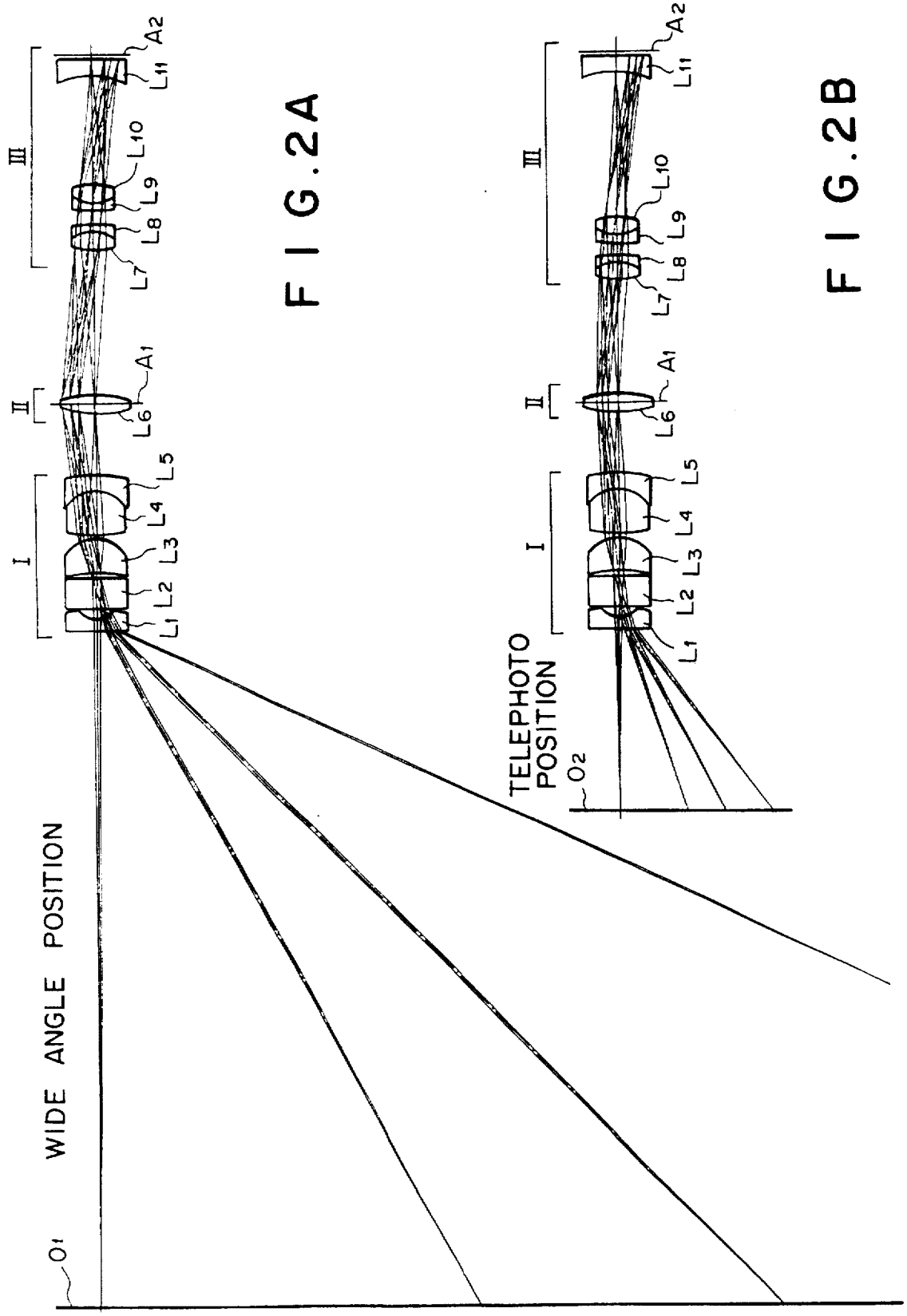

OBJECTIVE LENS FOR VARIABLE FIELD ANGLE ENDOSCOPE

BACKGROUND OF THE INVENTION

1. Field of the Invention

The present invention relates to an objective lens for an endoscope having a variable field angle.

2. Description of the Related Art

There is a demand for a wide area range to be first observed with a large field angle, and for the field angle of an objective lens of an endoscope to then be changed so as to observe a localized area around a target lesion with a smaller field angle.

To meet this demand, a part of an objective lens performs a zoom action in a conventionally known endoscope. However, in the case of the endoscope in which a zooming lens moves, a focal shift is also increased together with the movement of the zooming lens. To prevent this, a focus correction lens is provided which moves as the zooming lens moves. For this reason, it is considered that a mechanism for driving the lens, such as a cam, needs to be disposed at the front end of the endoscope to match the movement of the focus correction lens with that of the zooming lens.

However, the endoscope is designed to be inserted into the body of a patient, and hence the alleviation of pain must be taken into account above anything else. Therefore, it is necessary to design the endoscope so as to have a diameter at the front end of the endoscope which is reduced as much as possible and to eliminate any factors which will prevent smooth insertion.

Because of these considerations, it is difficult to apply the conventional technique, that is, the use of the mechanism for driving the focus correction lens together with the movement of the zooming leans to change a field angle, to the field of endoscopes.

In view of the above described drawbacks in the art, the object of the present invention is to provide an objective lens for use in a variable field angle endoscope which enables a field view to be changed without increasing the diameter of the front end of the endoscope or complicating the shape of the same.

SUMMARY OF THE INVENTION

According to one aspect of the present invention, this object is achieved by an objective lens for use in a variable field angle endoscope, comprising a front set of lenses having a positive power, and a rear set of lenses having a positive power, wherein a first image of a subject produced by the front set of lenses is formed as a second image of the subject by means of the rear set of lenses, and wherein the rear set of lenses are movable between a first position and a second position in such a way that a conjugate distance of the rear set of lenses for forming an image becomes substantially constant.

In one preferred embodiment, it is also possible to arrange the objective lens in such a way as to satisfy the following conditional expressions $$0.8 < \beta_1 \cdot \beta_2 < 1.2$$

where $\beta_1$ is an image magnifying factor of the rear set of lenses when the rear set of lenses are located at the first position, and $\beta_2$ is an image magnifying factor of the same when the rear set of lenses are located at the second position.

In another preferred embodiment, a concave lens having its concave surface facing the subject should more preferably be provided in the vicinity of the position where the second image is formed.

By virtue of the objective lens for an endoscope use having the above construction, it becomes unnecessary to adjust focus within the range between two lens positions where the conjugate distance of the objective lens for image formation become substantially constant. One of the two lens positions is set to a wide angle position at which the field angle becomes large, whereas the other lens position is set to a telephoto position at which the field angle becomes small.

Specifically, there are two lens positions where the field angle varies even if the conjugate distances are equal to each other. If the field angle is large, the image magnifying factor $\beta_w$ will be smaller. On the other hand, if the field angle is small, the image magnifying factor $\beta_T$ will be larger. The product of the former magnifying factor $\beta_w$ and the latter magnifying factor $\beta_T$ is about one.

A first image of the subject is formed by the front set of lenses, and a second image of the subject is formed by the rear set of lenses. In such a case, it is possible to change the field angle without changing a viewing distance between the two states considerably, i.e., in a large state and in a small state by switching the position of the rear set of lens between the two lens positions.

This makes it unnecessary to provide the front end of the endoscope with a drive mechanism, such as a cam, for moving the focus correction lens, and hence it will become possible to change the field view without increasing the diameter of the front end of the endoscope or complicating the shape of the same.

BRIEF DESCRIPTION OF THE DRAWINGS

FIG. 2A is a schematic representation showing the arrangement of an objective lens for a variable field angle endoscope in a wide angle position of a second embodiment of the present invention;

FIG. 2B is a schematic representation showing the second embodiment of the objective lens arrangement for the variable field angle endoscope in its telephoto position.

DESCRIPTION OF THE PREFERRED EMBODIMENTS

With reference to the accompanying drawings, preferred embodiments of the present invention will now be described in detail herein below.

Figure 1A:
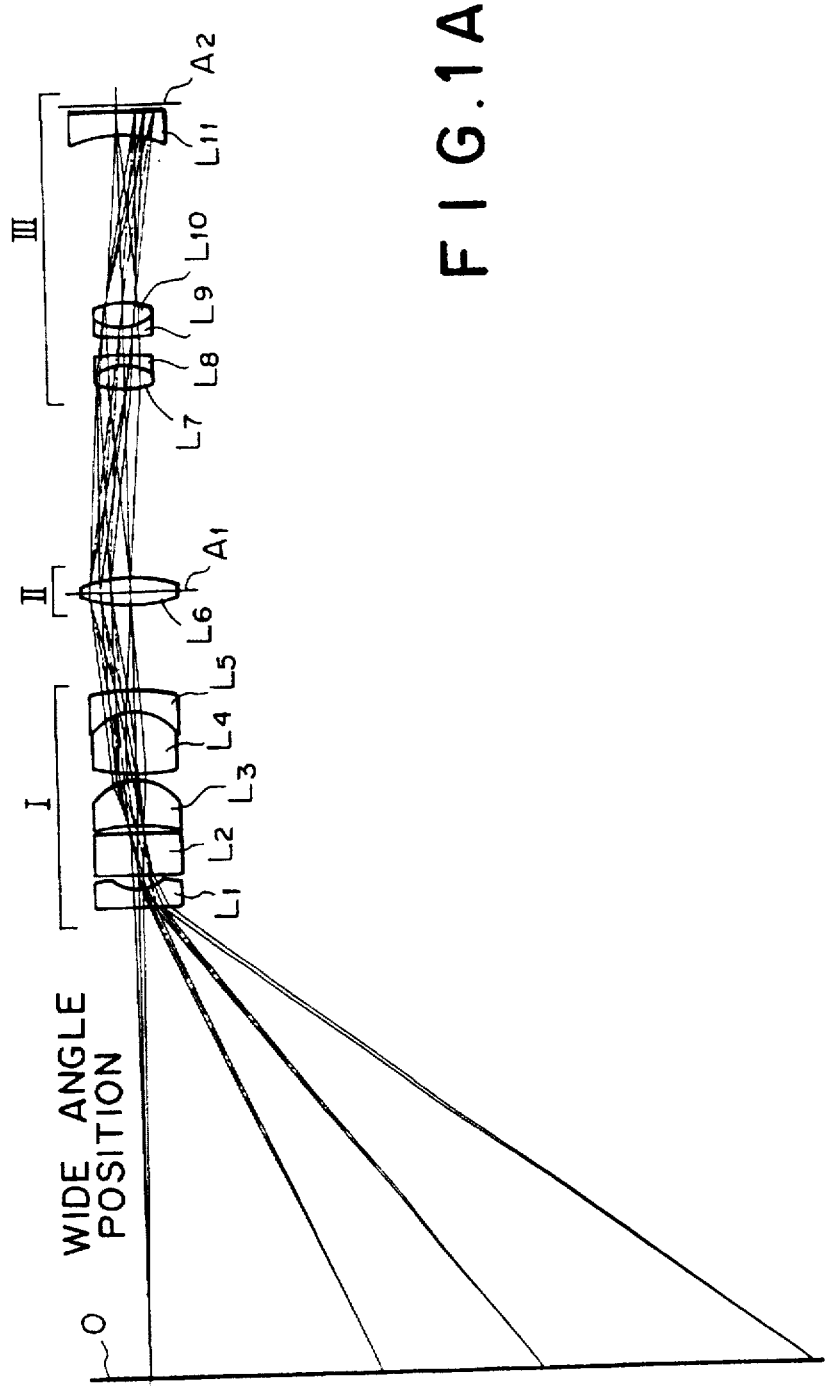
FIG. 1A is a schematic representation showing the arrangement of an objective lens for a variable field angle endoscope in a wide angle position of a first embodiment of the present invention.
Figure 1B:
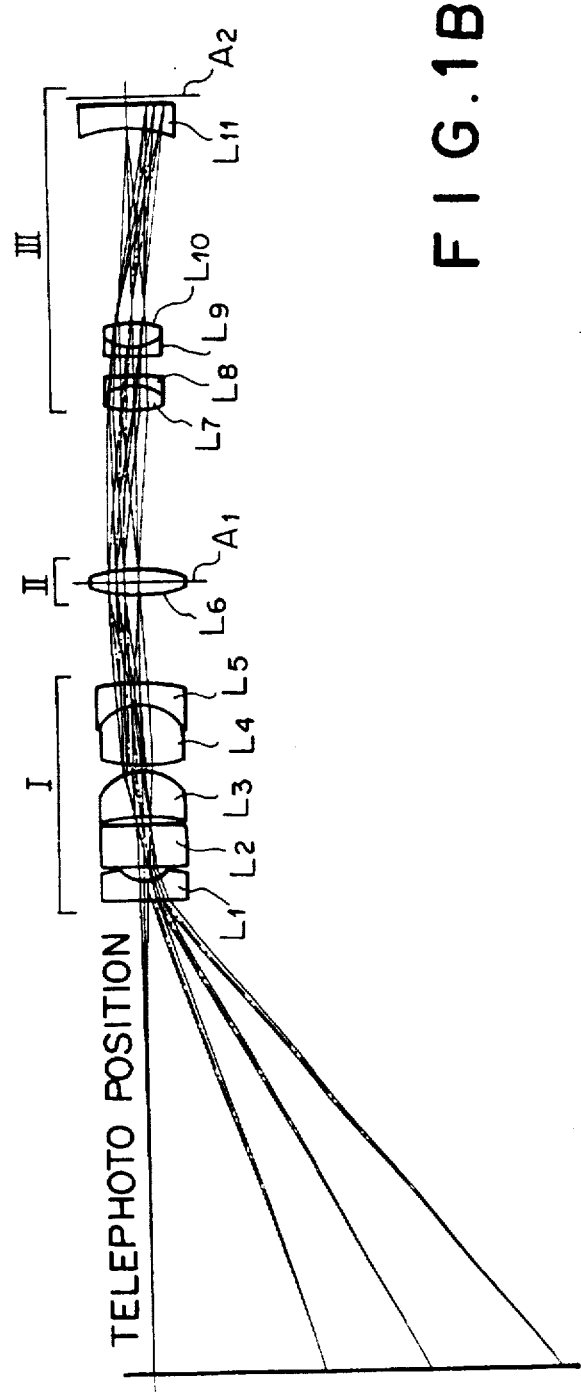
FIG. 1B is a schematic representation showing the first emobiment of the objective lens arrangement for the variable field angle endoscope in its telephoto position.

FIGS. 1A and 1B are a schematic representation showing the arrangement of an objective lens for use in a variable field angle endoscope in a first embodiment of the present invention when the objective lens is positioned at a wide angle position (FIG. 1A) or a telephoto position (FIG. 1B), and the paths of incident light rays associated with the arrangement.

The objective lens is made up of a first lens group I (a front set of lenses) consisting of five lenses $L_1$ to $L_5$ to form an image of a subject O at an image formation position $A_1$;

a second lens group II consisting of one field lens $L_6$ positioned in the vicinity of the first image formation position $A_1$; and a third lens group III (a rear set of lenses) for forming the subject image formed at the first image formation position $A_1$ at a second image formation position (an incident end surface of an optical fiber or a light receiving surface of a CCD) as another image. The third lens group consists of a relay lens, which further comprises four lenses $L_7$ to $L_{10}$, and a concave lens $L_{11}$ positioned in the vicinity of a second image formation position $A_2$. The lens $L_7$ and the lens $L_8$, and the lens $L_9$ and the lens $L_{10}$ are respectively cemented together.

The relay lenses $L_7$ to $L_{10}$ in the third lens group III are movable between two positions. The first position is a wide angle position (shown in FIG. 1A), and hence a field angle of the objective lens becomes large when these relay lenses are positioned at the first position. The second position is a telephoto position (shown in FIG. 1B), and hence the field angle of the objective lens becomes small when the relay lenses are positioned at the second position.

Even when the relay lenses $L_7$ to $L_{10}$ are switched from one position to another position, a focused image of the subject is formed at the second image formation position $A_2$ without changing the conjugate distance, that is, a distance between the first and second image formation positions $A_1$ and $A_2$, and without changing the positions of other lenses.

The field lens $L_6$ constituting the second lens group II is disposed to match the exit pupil of the first lens group with the incident pupil of the third lens group.

The concave lens L11 disposed in the vicinity of the second image formation position $A_2$ is arranged with a concave surface thereof facing the subject so as to correct field tilt.

The relay lenses $L_7$ to $L_{10}$ are used at the position where an image magnifying factor of one lens will be the reciprocal of an image magnifying factor of another lens, and hence the lenses are symmetrically arranged. All that needs to be done is to make a pair of lenses $L_7$ and $L_{10}$, and a pair of lenses $L_8$ and $L_9$ the same. This renders the objective lens of the present invention advantageous from the point of view of workability.

Table 1 shows parameters of the objective lens in the first embodiment, namely; a radius of curvature r (mm) of each lens surface; "d" (mm) which is the center thickness of each lens and an air interval between lenses; a refractive index "$n_d$" of each lens in the direction of a line "d"; an Abbe number $v_d$ of each lens; distances (mm) to the subject when the rear set of lenses are positioned at the wide angle position and the telephoto position (i.e., a distance between the subject and the front surface of the first lens L1 which applies to the rest of the specification); $d_{12}$ (mm); $d_{18}$ (mm); magnifying factors of relay lenses (magnifying factors of the relay lenses $L_7$–$L_{10}$ which apply to the rest of the specification); field angles; the product of relay magnifying factors $\beta_w$ and $\beta_T$; and the size of an image (mm) at the second image formation position $A_2$.

Numerals in the leftmost column in table 1 represent the order of the lenses from the subject.

TABLE 1

| | r | d | $n_d$ | $v_d$ |
|---|---|---|---|---|
| 1 | ∞ | 0.4 | 1.81550 | 44.4 |
| 2 | 0.7018 | 0.25 | | |

TABLE 1-continued

| | r | d | $n_d$ | $v_d$ |
|---|---|---|---|---|
| 3 | 11.5555 | 0.95 | 1.72342 | 38.0 |
| 4 | ∞ | 0.05 | | |
| 5 | (stop) | 0.05 | | |
| 6 | −6.1735 | 1.0 | 1.72000 | 50.3 |
| 7 | −1.1219 | 0.1 | | |
| 8 | 4.1339 | 1.3 | 1.72000 | 50.3 |
| 9 | −0.9530 | 0.4 | 1.78472 | 25.7 |
| 10 | −5.7925 | 1.8 | | |
| 11 | 4.4328 | 0.5 | 1.62041 | 60.3 |
| 12 | −3.1553 | $d_{12}$(variable) | | |
| 13 | 1.8283 | 0.5 | 1.62041 | 60.3 |
| 14 | −0.9837 | 0.2 | 1.79950 | 42.3 |
| 15 | −8.6943 | 0.4 | | |
| 16 | 8.6943 | 0.2 | 1.79950 | 42.3 |
| 17 | 0.9837 | 0.5 | 1.62041 | 60.3 |
| 18 | −1.8283 | $d_{18}$(variable) | | |
| 19 | −2.2654 | 0.5 | 1.62004 | 36.3 |
| 20 | ∞ | | | |
| 21 | ∞ | | | |

| | Wide angle position | Telephoto position |
|---|---|---|
| Subject distance | 10.0 | 10.0 |
| $d_{12}$ | 4.0 | 3.4 |
| $d_{18}$ | 3.4 | 4.0 |
| Multiplying factor of Relay lenses | −0.957($\beta_W$) | −1.233($\beta_T$) |
| Field angle | 104° 43' | 76° 27' |
| $\beta_W \cdot \beta_T = 1.180$ | | |
| Image size = ø1.60 | | |

FIGS. 2A and 2B are a schematic representation showing the arrangement of an objective lens for use in a variable field angle endoscope in a second embodiment of the present invention when the objective lens is positioned at a wide angle position (FIG. 2A) or a telephoto position (FIG. 2B), and the paths of incident light rays associated with the arrangement.

This objective lens has the same arrangement as the lens in the first embodiment. In the first embodiment, the lens interval $d_{12}$ of the front pair of lenses $L_7$ and $L_8$, and the lens interval $d_{18}$ of the rear pair of lenses $L_9$ and $L_{10}$ are interchanged between the wide angle position and the telephoto position. However, in this second embodiment, these intervals are not interchanged.

According to the second embodiment, a difference in field angle between the time when the relay lenses are situated at the wide angle position and the time when they are situated at the telephoto position, is achieved by changing the distance between the relay lenses and the subject $O_1$ when the lenses are situated at the wide angle and the distance between the relay lenses and the subject $O_2$ when the lenses are situated at the telephoto position, to a certain degree.

The second embodiment is the same as the first embodiment with respect to the radius of curvature "r" (mm) of each lens surface, the air interval "d" (mm) which is the center thickness of each lens and an interval between lenses, a refractive index nd of each lens in the direction of the line d, an Abbe number $v_d$ of each lens, and the size of image (mm) at the second image formation position $A_2$. Hence, the explanation thereof will be omitted here for brevity. However, the second embodiment is different from the first embodiment with respect to the distances (mm) to the subject when the rear set of lenses are positioned at the wide angle position and the telephoto position, $d_{12}$ (mm), $d_{18}$ (mm), the magnifying factors of the relay lenses, the field angles, and the product of relay magnifying factors $\beta_W$ and $\beta_T$. These different parameters are shown in Table 2.

TABLE 2

|  | Wide angle position | Telephoto position |
| --- | --- | --- |
| Subject distance | 20.11 | 5.37 |
| $d_{12}$ | 4.4 | 3.4 |
| $d_{18}$ | 3.1 | 4.1 |
| Multiplying factor of Relay lenses | −0.820($\beta_W$) | −1.279($\beta_T$) |
| Field angle | 129° 15' | 74° 17' |
| $\beta_W \cdot \beta_T = 1.049$ | | |

The objective lens for a variable field angle endoscope according to the present invention is not limited to the lenses illustrated in the above embodiments. The object lens is subject to various modifications. For example, it is possible to change the shape and thickness, or an interval between, lenses constituting the front set of lenses or the rear set of lenses, as required.

Moreover, it is possible to omit the field lens $L_6$ and the concave lens $L_{11}$ in the above embodiments, as required.

Still further, it is possible to constitute the objective lens in such a way that the direction of a field of view is changed by inserting a mirror or a prism between the rear set of lenses.

Finally, various known mechanisms in the field of endoscopes or cameras, or other technical fields, are applicable as the mechanism for driving the rear set of lenses.

Several embodiments of the invention have now been described in detail. It is to be noted, however, that these descriptions of specific embodiments are merely illustrative of the principles underlying the inventive concept. It is contemplated that various modifications of the disclosed embodiments, as well as other embodiments of the invention will, without departing from the spirit and scope of the invention, be apparent to persons skilled in the art.

What is claimed is:

1. An objective lens system for use in a variable field angle endoscope, comprising:
    a front set of lenses having a positive power with a fixed position relative to a front end of the endoscope;
    a rear set of lenses having a positive power and movable with respect to the front end of the endoscope between a first position and a second position;
    wherein a first image of a subject produced by the front set of lenses at a first image formation position is formed as a second image of the subject at a second image formation position by means of the rear set of lenses, and a distance between the first and second image formation positions is substantially constant during movement of the rear set of lenses between said first position and said second position, whereby focus adjustment of the endoscope lens system is maintained during movement of said rear set of lenses from said first position to said second position.

2. The objective lens system according to claim 1, wherein the rear set of lenses satisfy the following conditional expressions $0.8 < \beta_1 \cdot \beta_2 < 1.2$ where $\beta_1$ is an image magnifying factor of the rear set of lenses when the rear set of lenses are located at the first position, and $\beta_2$ is an image magnifying factor of the same when the rear set of lenses are located at the second position.

3. The objective lens system according to claim 1, wherein a lens with a concave surface thereof facing the subject is provided in the vicinity of the position where the second image is formed.

4. The objective lens system according to claim 2, wherein a lens with a concave surface thereof facing the subject is provided in the vicinity of the position where the second image is formed.

5. The objective lens system of claim 1 wherein said movable rear set of lenses comprises a plurality of relay lenses having reciprocal image magnifying factors and arranged symmetrically according to said reciprocal image magnifying factors.

6. The objective lens system of claim 5 further comprising a concave lens fixed in the vicinity of the second image formation position to correct field tilt.

7. The objective lens system of claim 1 further comprising a lens fixed in the vicinity of the second image formation position to correct field tilt.

8. The objective lens system of claim 1 wherein said front set of lenses includes a field lens located at the first image formation position to match the exit pupil of the front set of lenses with the incident pupil of the rear set of lenses.

9. The objective lens system of claim 1 wherein the rear set of lenses move together in a relatively fixed relationship between the first position and the second position, and the first position is closer to the front end of the endoscope than the second position.

10. An objective lens system for use in a variable field angle endoscope, consisting of:
    a front set of lenses having a positive power with a fixed position relative to a front end of the endoscope and producing a first image of a subject at a first image formation position;
    a rear set of lenses having a positive power and movable with respect to the front end of the endoscope between a first position and a second position to form said first image as a second image of the subject at a second image formation position; and
    a lens fixed in the vicinity of the second image formation position;
    wherein a distance between said first and second image formation positions is substantially constant during movement of the rear set of lenses between said first position and said second position.

11. The objective lens system of claim 10 wherein said movable rear set of lenses comprises a plurality of relay lenses having reciprocal image magnifying factors and arranged symmetrically according to said reciprocal image magnifying factors.

12. The objective lens system of claim 11 wherein the lens in the vicinity of the second image formation position is a lens for correcting field tilt and has a concave surface facing the subject.

13. The objective lens system of claim 10 wherein the lens in the vicinity of the second image formation position is a lens for correcting field tilt and has a concave surface facing the subject.

14. The objective lens system of claim 10 wherein said front set of lenses includes a field lens located at the first image formation position to match the exit pupil of the front set of lenses with the incident pupil of the rear set of lenses.

15. The objective lens system of claim 10 wherein the rear set of lenses satisfy the following conditional expressions $$0.8 < \beta_1 * \beta_2 < 1.2$$

where $\beta_1$ is an image magnifying factor of the rear set of lenses when the rear set of lenses are located at the first position, and $\beta_2$ is an image magnifying factor of the same when the rear set of lenses are located at the second position.

16. The objective lens system of claim 15 wherein the lens in the vicinity of the second image formation position has a concave surface facing the subject.

17. The objective lens system of claim 10 wherein the lens in the vicinity of the second image formation position has a concave surface facing the subject.

* * * * *